United States Patent [19]

Beacom

[11] 4,279,425
[45] Jul. 21, 1981

[54] DUAL SEAL GASKET

[76] Inventor: Roger Beacom, 942 W. Douglas Ct., Venice, Fla. 33595

[21] Appl. No.: 185,310

[22] Filed: Sep. 8, 1980

[51] Int. Cl.³ .............................................. F16J 15/10
[52] U.S. Cl. ........................... 277/207 A; 277/DIG. 2
[58] Field of Search ................... 277/207 A, 205, 206, 277/DIG. 2

[56] References Cited

U.S. PATENT DOCUMENTS

| | | | |
|---|---|---|---|
| 2,809,853 | 10/1957 | Nathan | 277/207 A |
| 3,414,273 | 12/1968 | Sumner | 277/207 A |
| 4,174,859 | 11/1979 | Itoughton | 277/207 A |

*Primary Examiner*—Robert I. Smith
*Attorney, Agent, or Firm*—Arthur W. Fisher, III

[57] ABSTRACT

A dual seal gasket specifically configured to seal the joint between adjacent concrete pipes comprising an annular substantially resilient member including a first retainer element engaging disposed on the outer surface of one of the adjacent concrete pipes having its longitudinal axis substantially parallel to the longitudinal axis of the adjacent concrete pipes, a first sealing element including an upper and lower enlarged truncated compressible members interconnected by a reduced intermediate member extending inwardly from the first retainer element and substantially perpendicular thereto and a second sealing element including a compressible body having a pair of compressible finger members extending outwardly therefrom in a substantially V-shaped configuration having its longitudinal axis substantially parallel to the longitudinal axis of the first retainer element and substantially perpendicular to the longitudinal axis of the first sealing element such that as the adjacent concrete pipes are placed in operative relation relative to each other the first retainer element retains the dual seal gasket therebetween as the first and second sealing elements are compressed therebetween to seal the joint between the adjacent concrete pipes.

1 Claim, 2 Drawing Figures

DUAL SEAL GASKET

BACKGROUND OF THE INVENTION

1. Field of the Invention

A dual seal gasket specifically configured to seal the joint between adjacent concrete pipes.

2. Description of the Prior Art

Numerous efforts have been made to provide a pipe connection comprising a penetrating pipe and a receiving pipe. Various retaining rings or sealing rings are exployed which extend into the inner side of the receiving pipe ending a short distance from the free end of the pipe wherein the diameter of the retaining ring being substantially equal to the inner diameter of the receiving pipe.

Such pipe connections are known but present particular disadvantages. The retaining ring for instance can be easily damaged when the pipe with ring strikes the surface of the ground at a high angle. Moreover the ring, in case of such a fall, may be slightly displaced whereby the clamping effect is impaired.

An effort to obviate these difficultes because the sealing body part only cooperates partially with the bottom of the retaining ring and the latter cooprates resiliently and clampingly with the outer side of the receiving pipe part is disclosed in U.S. Pat. No. 3,857,589.

As shown, the sealing body acts as a resilient member supporting the retaining ring, while the resilient clamping permits a certain displacement of the retaining ring. The local cooperation between the bottom of the ring and the sealing body part is obtained by constructing the sealing body part such that it ends in a point, or by causing the sealing body part to cooperate by two protruding ribs with the bottom and by causing the part of the sealing body, situated between these two ribs to end at some distance from the bottom.

Unfortunately this as well as others shown in U.S. Pat. Nos. 2,832,614; 3,315,971; 3,656,771; 4,084,828; 3,857,589; 3,520,541; 3,515,396; 3,675,685, still exhibit various shortcomings. Thus a need still exist for a reliable sealing means.

SUMMARY OF THE INVENTION

The present invention relates to a dual seal gasket specifically configured to seal the joint between adjacent concrete pipes comprising a resilient member including a first retainer element, first sealing element and second sealing element.

The first retainer element comprises a retainer member configured to engage the outer surface of one of the adjacent concrete pipes such that the longitudinal axis of the retainer member is substantially parallel to the longitudinal axes of the adjacent concrete pipes. When so disposed the engagement therebetween prevents the dual seal gasket from slipping into the joint or groove between the adjacent concrete pipes.

The first sealing element comprises an upper and lower compressible members interconnected by a reduced intermediate member. The first sealing element is coupled to the first retainer member and second sealing element by outer and inner interconnecting elements. As disclosed the first sealing element extends inwardly from the first retainer element and is disposed substantially perpendicular thereto.

The second sealing element comprises a compressible body having a pair of compressible finger members extending outwardly therefrom to form a channel therebetween. As disclosed, the longitudinal axis of the second sealing element is substantially parallel to the longitudinal axis of the first retainer element and substantially perpendicular to the longitudinal axis of the first sealing element.

In operation the dual sealing gasket is placed in operative relation to one of the adjacent concrete pipes such that the retainer member engages the outer surface of one of the adjacent pipes. Then the second adjacent concrete pipe is moved in coaxial relationship relative to the first adjacent concrete pipe to initially start the formation of the joint. As the two concrete adjacent pipes are moved inwardly or together relative to each other, the upper and lower compressible members are compressed between the joint. Simultaneously the compressible body together with the compressible finger members are compressed.

The invention accordingly comprises the features of construction, combination of elements, and arrangements of parts that will be exemplified in the construction hereinafter set forth, and the scope of the invention will be indicated in the claims.

BRIEF DESCRIPTION OF THE PRIOR ART

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
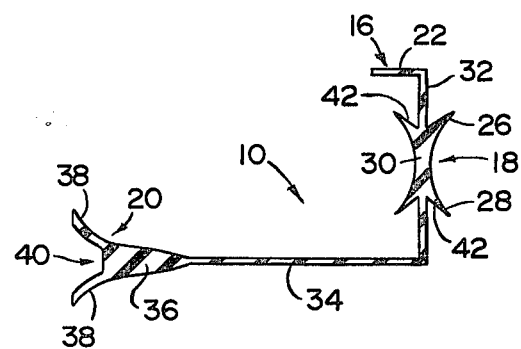
FIG. 1 is a side view of the double seal gasket in the uncompressible state.
Figure 2:
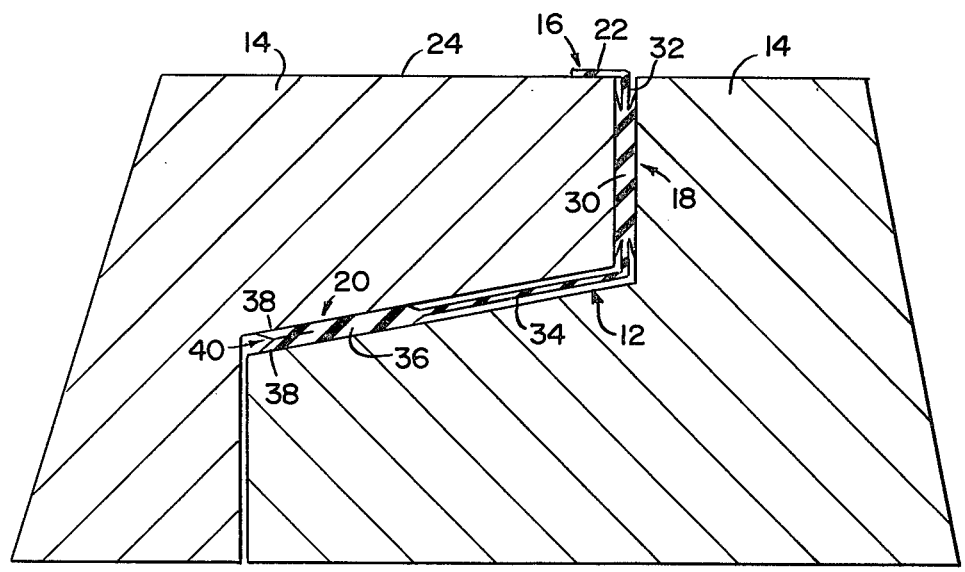
FIG. 2 is a side view of the double seal gasket in the compressible state.

As shown in FIGS. 1 and 2, the present invention relates to a dual seal gasket generally indicated as 10 specifically configured to seal the joint 12 between adjacent concrete pipes 14 or the like. More specifically, the dual seal gasket 10 comprises an annular substantially resilient member including a first retainer element, first sealing element and second sealing element generally indicated as 16, 18 and 20 respectively.

The first retainer element 16 comprises an annular retainer member 22 configured to engage the outer surface 24 of one of the adjacent concrete pipes 14 such that the longitudinal axis of the annular retainer member 22 is substantially parallel to the longitudinal axes of the adjacent concrete pipes 14. When so disposed the engagement therebetween prevents the dual seal gasket 10 from slipping into the joint or groove 12 between the adjacent concrete pipes 14.

The first sealing element 18 comprises an upper and lower enlarged truncated compressible members 26 and 28 respectively interconnected by a reduced intermediate member 30. The first sealing element 18 is coupled to the first retainer member 16 and second sealing element 20 by outer and inner interconnecting elements 32 and 34 respectively. As disclosed the first sealing element 18 extends inwardly from the first retainer element 16 and is disposed substantially perpendicular thereto.

The second sealing element 20 comprises a compressible substantially cone shaped body 36 having a pair of compressible finger members 38 extending outwardly therefrom to form a substantially V-shaped channel 40 therebetween. As disclosed, the longitudinal axis of the second sealing element 20 is substantially parallel to the longitudinal axis of the first retainer element 16 and substantially perpendicular to the longitudinal axis of the first sealing element 18.

As shown in FIG. 1, the first sealing element 18 may include a pair of substantially V-shaped channels 42 disposed on opposite sides of the upper and lower enlarged truncated compressible members 26 and 28 respectively. These together with the substantially V-shaped channel 40 on the second sealing element 20 provide a means of preventing fluid flow there against.

In operation the dual sealing gasket 10 is placed in operative relation to one of the adjacent concrete pipes 14 such that the annular retainer member 22 engages the outer surface 24 of one of the adjacent pipes 14. Then the second adjacent concrete pipe 14 is moved in coaxial relationship relative to the first adjacent concrete pipe 14 to initially start the formation of the joint 12. As the two concrete adjacent pipes 14 are moved inwardly or together relative to each other, the upper and lower enlarged truncated compressible members 26 and 28 are compressed between the joint 12. Simultaneously the compressible substantially cone shaped body 36 together with the compressible finger members 28 are compressed as best shown in FIG. 2.

As such a double seal is formed along the joint 12 between the adjacent pipes 14. It should be noted that the first retainer element 16 retains the dual seal gasket 10 in operative relationship during the joining process. Moreover as the adjacent concrete pipes 14 are jointed the first sealing element 18 further prevents the second sealing element 20 from moving inwardly along the joint 12 too deeply.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

Now that the invention has been described,

What is claimed is:

1. A dual seal gasket specifically configured to seal the joint between two adjacent pipes comprising an annular resilient member including a first retainer lement disposed to engage the outer surface of at least one of the adjacent pipes, a first sealing element including an upper and lower enlarged truncated compressible member interconnected by a reduced intermediate member, said upper and lower enlarged truncated compressible members each includes a pair of substantially V-shaped channels disposed on opposite sides thereof, and a second sealing element including a substantially cone-shaped compressible body, and a pair of compressible fringe members extending outwardly from said substantially cone-shaped body to cooperatively form a channel therebetween, wherein the longitudinal axis of the said second sealing element is substantially parallel to the longitudinal axis of said first retainer element and substantially perpendicular to the longitudinal element of said first sealing element such that as the adjacent pipes are placed in operative relation relative to each other said first retainer element retains said dual seal gasket therebetween as said first and second sealing elements are compressed therebetween to seal the joint between the adjacent pipes.

* * * * *